Patented Apr. 23, 1929.

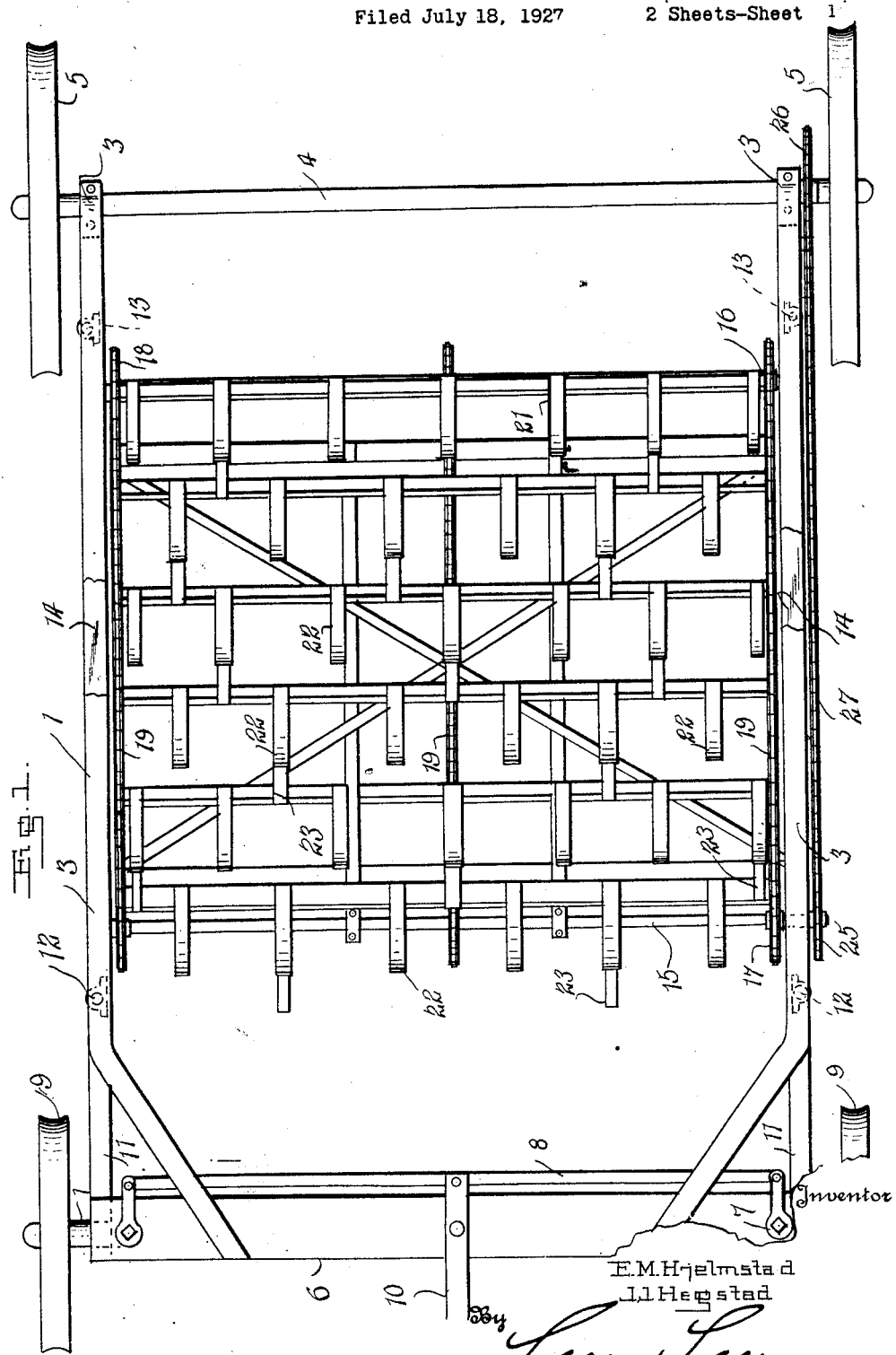

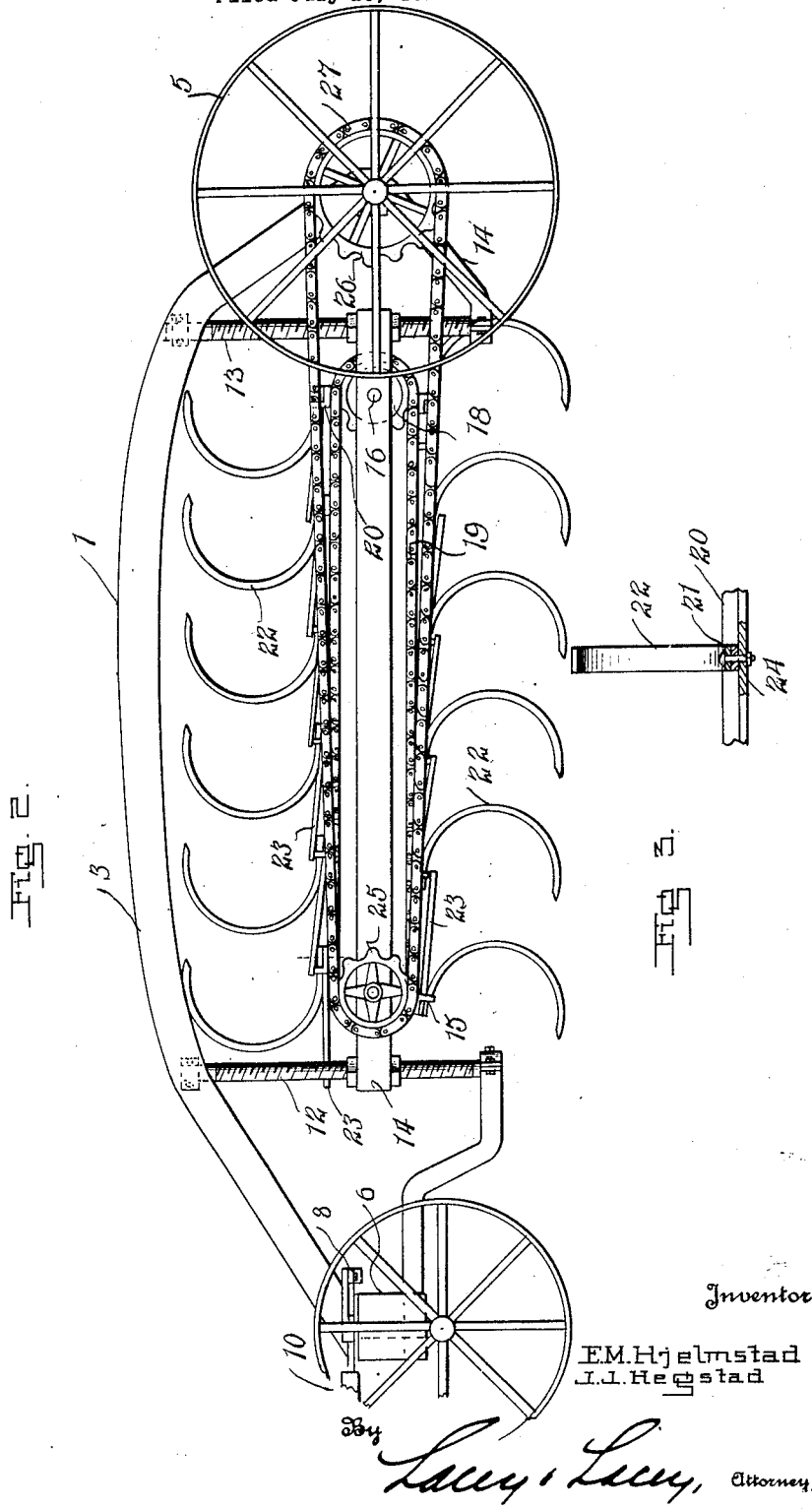

1,710,259

UNITED STATES PATENT OFFICE.

EINAR M. HJELMSTAD AND JOHN J. HEGSTAD, OF HOLMES, NORTH DAKOTA.

GRASS AND WEED DIGGING MACHINE.

Application filed July 18, 1927. Serial No. 206,626.

The present invention is directed to improvements in grass and weed digging machines.

The primary object of the invention is to provide a machine of this character so constructed that the weeds and grass will be liberated from the digging teeth in order to prevent clogging thereof, thereby greatly increasing the efficiency of the machine.

Another object of the invention is to provide a machine of this type so constructed that the digging teeth thereof will travel at a speed lower than that of the machine in order to insure that the teeth will drag in the earth to more effectively uproot the objectionable vegetation, such, for instance, as quack grass.

In the accompanying drawings:

Figure 1 is a top plan view of the machine.

Figure 2 is a side elevation thereof.

Figure 3 is a fragmentary front view of one of the bars showing the manner in which the brace strips and teeth are secured thereto.

Referring to the drawings, the numeral 1 designates a frame consisting of a pair of laterally spaced arched bars 2, the rear ends of which are provided with boxes 3 for rotatively receiving the axle, the ends of which having carried thereby ground wheels 5.

The forward ends of the bars 2 are secured upon a beam 6, said beam having stub axles 7 carried by its ends which are connected by a connecting bar 8, there being wheels 9 engaged upon said axles. A draft coupling bar 10 is pivotally connected to the beam 6 and to the bar 8, and will obviously control movement of the front wheels 9.

Draft animals, or a tractor, may be connected to bar 10 in order to propel the machine across a field.

A pair of brackets 11 are supported by the beam 6 and have journaled in their rear ends the lower ends of the threaded shafts 12, the upper ends thereof being rotatably supported by the bar 2. A pair of similar shafts 13 have their lower ends journaled in the forward ends of the brackets 14 supported by the rear ends of the bar 2, the upper ends thereof being rotatably engaged with the bar 3.

Adjustably threaded upon the shafts 12 and 13 are the ends of the sills 14, said sills having journaled therein front and rear shafts 15 and 16 which have fixed thereto outer sprockets 17 and central sprockets 18. Trained around these sprockets are sprocket chains 19 which have secured thereto the ends of the angle iron bar 20 which are provided with notches 21 in which are engaged the inner ends of the teeth 22 and the inner ends of the brace strips 23, clamping bolts 24 being provided for securing said teeth and strips to the bars, the strips being of such length as to have free ends engaged with the adjacent bar 20.

In order to drive the chains 19 and thus the teeth 22, the shaft 15 has fixed thereto a sprocket wheel 25, which is alined with a similar but larger sprocket wheel 26, fixed to the rear end of the axle 4, and trained around these sprocket wheels is a sprocket chain 27 which transmits rotary motion to the shaft 15 to impart similar movement to the chains 19, thereby causing the chains to travel in a forward direction, but at a slower speed than that of the chain 27, owing to the larger diameter of the sprocket wheel 26.

In this manner, the points of the teeth 22 will penetrate the ground in the direction of travel of the machine and will slowly move rearwardly in order that when elevated the weeds or grass carried thereby will drop from the teeth, thus preventing clogging of the teeth and consequent inefficient operation of the machine.

Excellent results have been obtained by regulating the travel of the chains 19 and teeth 22 so that the teeth will travel one-third as fast as the machine, thereby permitting the teeth 22 to drag and effectively uproot the grass.

The brace strips 23 will obviously prevent the lower stretches of the chains 19 from sagging upwardly in order that the teeth will be firmly held in penetrating engagement with the earth.

Since the teeth 22 are arcuate in shape and are so arranged that their convex faces travel toward the rear of the machine, they will obviously prevents roots and grass from clinging thereto as the stretches of the chains 19 travel around the rear axle 4.

Having thus described the invention, what we claim is:

A machine of the class described, comprising a wheeled frame including a pair of laterally spaced bars, brackets associated with the ends of the bars, threaded shafts having their upper and lower ends journaled, respectively, in the bars and brackets, spaced sills having their ends threaded for adjustment on the shafts, shafts journaled in the sills, chains connected to and supported by the last named shafts, and means for driving one of the last named shafts to impart movement to the chains in a forward direction at a speed less than the travel of the machine.

In testimony whereof we affix our signatures.

EINAR M. HJELMSTAD. [L. S.]
JOHN J. HEGSTAD. [L. S.]